(12) United States Patent
Gezici et al.

(10) Patent No.: US 7,817,091 B2
(45) Date of Patent: Oct. 19, 2010

(54) SINGLE INPUT MULTIPLE OUTPUT (SIMO) RANGING AND POSITIONING SYSTEMS

(75) Inventors: Sinan Gezici, Ankara (TR); Zafer Sahinoglu, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 387 days.

(21) Appl. No.: 12/026,707

(22) Filed: Feb. 6, 2008

(65) Prior Publication Data

US 2009/0195456 A1 Aug. 6, 2009

(51) Int. Cl.
*G01S 1/24* (2006.01)

(52) U.S. Cl. .................................. 342/387

(58) Field of Classification Search .......... 342/380–387
See application file for complete search history.

(56) References Cited

U.S. PATENT DOCUMENTS 6,317,474 B1 * 11/2001 Carsello .................. 375/354
7,525,483 B2 * 4/2009 Eberlein .................. 342/387

* cited by examiner

*Primary Examiner*—Thomas H Tarcza
*Assistant Examiner*—Nga X Nguyen
(74) *Attorney, Agent, or Firm*—Dirk Brinkman; Gene Vinokur

(57) ABSTRACT

A method estimates a delay in a time of arrival (TOA) of a transmitted signal by receiving the transmitted signal at multiple antennas via corresponding channels. Each received signal is correlated with the transmitted signal to obtain estimated channel coefficients and an estimated TOA. A variance of noise is also obtained for each received signal. A weight is determined for each received signal by dividing the channel coefficients by the variance of the noise. The weights are summed, and each weight is multiplied by the estimated TOA to produce a weighted estimated TOA, which are also summed. The summed weighted estimated TOA are divided by the summed weights to determine a final TOA estimate with respect to the transmitted signal.

10 Claims, 5 Drawing Sheets

300

SINGLE INPUT MULTIPLE OUTPUT (SIMO) RANGING AND POSITIONING SYSTEMS

FIELD OF THE INVENTION

This invention is related in general to wireless ranging and positioning systems, and in particular to ranging and positioning in single input, multiple output SIMO) wireless systems.

BACKGROUND OF THE INVENTION

Single-input, multiple output (SIMO) and multiple-input, multiple-output (MIMO) wireless architectures are now common for high speed wireless communication systems. By means of multiple antennas and multiple processing units, e.g., transmit and receive RF chains, the quality of communications between wireless devices can be increased via diversity and multiplexing techniques. The advantages of MIMO architectures have been described extensively for communications systems, but not for ranging and positioning systems.

In SIMO and MIMO systems, multiple antenna elements are spaced to form phased array structures in radar and positioning applications. MIMO systems have been considered for radar applications for better detection and characterization of target objects.

FIG. 1A shows a conventional single-input, multiple-output (SIMO) phased array radar structure 100. In this example, there is one transmitter T1 101 including an antenna, and N receivers R1 102 through RN 103, each also including an antenna. Typically, the receivers and their antennas are approximately collocated at a single site.

A signal s(t) 111 is transmitted. The signal s(t) 111 arrives at the receivers as $\alpha$ s(t−$\tau$) 112-113, where $\alpha$ is a channel coefficient and $\tau$ is a delay time. The signal received at time t at the $i^{th}$ receiver $r_i$ can be modeled as $$r_i(t) = \alpha s(t-\tau) + n_i(t), \; t \in [0,T] \quad (1)$$

for i=1, ..., N, in the time interval 0, T where T is the duration of the transmitted signal s(t) 111. The noise $n_i(t)$ is a complex valued white Gaussian noise process with zero mean and a spectral density $\sigma_i^2$.

FIG. 1B shows conventional phased array processing. All the received signals 110 through 120 are aggregated 125, and then fed to a correlator 130. The output of the correlator is entered into a time of arrival (TOA) estimation unit 150, which returns an estimate of the TOA $\hat{\tau}$ 160. The channel coefficients for the received signals are constant and the same.

In statistics, the well known Cramér-Rao bound (CRB) or Cramér-Rao lower bound (CRLB) expresses a lower bound on a variance of an estimator of a deterministic parameter. The CRLB for the variance of the estimated delay time $\hat{\tau}$ 160 is $$\text{Var}\{\hat{\tau}\} \geq \frac{1}{\gamma |\alpha|^2 \sum_{i=1}^{N} \frac{1}{\sigma_i^2}} \quad (2)$$

where $\gamma = \tilde{E} - \hat{E}^2/E$, $\alpha$ is the channel coefficient, N is the number of antennas and receivers, and $\sigma_i^2$ is the variance of noise at the receiver $r_i$. Also, $$\hat{E} = \left| \int_{-\infty}^{\infty} s'(t) s^*(t) dt \right|,$$

E is the energy of the transmitted signal s(t) 111, and $\tilde{E}$ is the energy of the first derivative of the signal s(t). The derivative of the signal s(t) is denoted as s'(t), and the complex conjugate of s(t) is denoted as s*(t).

It is seen from the CRLB Equation (2) that a significantly fading signal path can result in a substantially large CRLB. For the case of known channel coefficients, the square root of the corresponding CRLB of the variance of the distance estimate $\hat{d}$ is $$\sqrt{\text{Var}\{\hat{d}\}} \geq \frac{c}{2\pi \sqrt{N} \beta \sqrt{SNR}}, \quad (3)$$

where c is the speed of light, N is the number of antenna elements at the receiver, SNR is the signal to noise ratio, and $\beta$ is the effective bandwidth of the signal s(t).

SUMMARY OF THE INVENTION

A method estimates a delay in a time of arrival (TOA) of a transmitted signal by receiving the transmitted signal at multiple antennas via corresponding channels.

Each received signal is correlated with the transmitted signal to obtain estimated channel coefficients and an estimated TOA. A variance of noise is also obtained for each received signal.

A weight is determined for each received signal by dividing the channel coefficients by the variance of the noise. The weights are summed, and each weight is multiplied by the estimated TOA to produce a weighted estimated TOA, which are also summed.

The summed weighted estimated TOA are divided by the summed weights to determine a final TOA estimate with respect to the transmitted signal.

DETAILED DESCRIPTION OF THE PREFERRED EMBODIMENTS

Signal Model

Figure 2A:
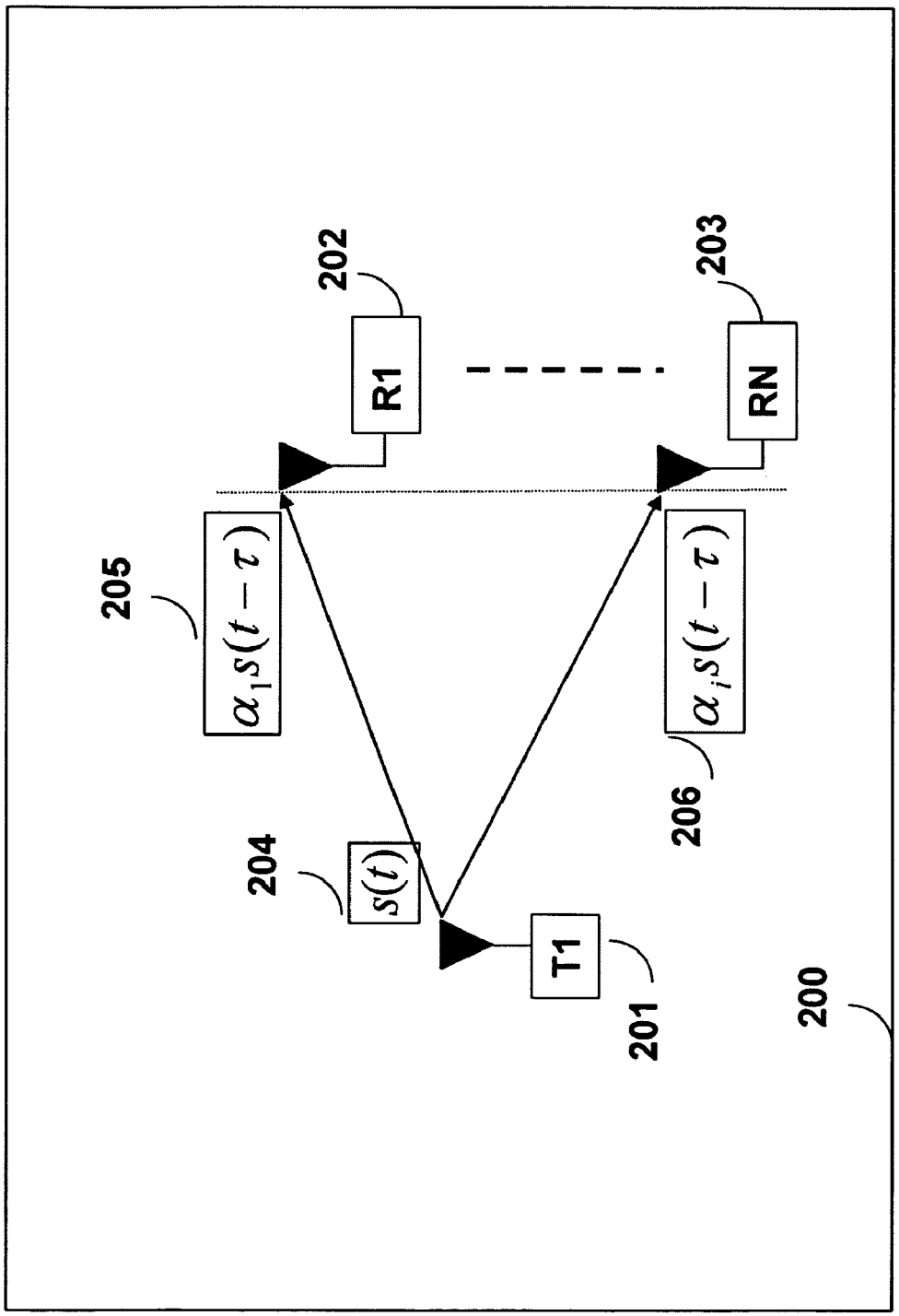
FIG. 2A is a block diagram of a SIMO system used by the embodiments of the invention.

FIG. 2A shows a SIMO system 200 used by embodiments of our invention. The system includes one transmitter and antenna 201, and N receivers 202 through 203, each also with one antenna. Typically, the antennas at the receivers are approximately collocated such that a maximum distance between a pair of adjacent antennas divided by the speed of light is substantially smaller than a symbol duration of a transmitted signal. Therefore, the base-band received signal at the $i^{th}$ antenna can be expressed as $$r_i(t) = \alpha_i s(t-\tau) + n_i(t), \, t \in [0,T] \quad (4)$$

for $i = 1 \ldots N$, where $s(t)$ is the base-band representation of the transmitted signal, $\alpha_i$ is a channel coefficient of the received signal at the $i^{th}$ receiver, $\tau$ is the time of arrival TOA after transmitting the signal, and $n_i(t)$ is a complex valued white Gaussian noise process with zero mean and spectral density or variance $\sigma_i^2$. The noise processes at different receiver branches are independent.

Figure 1A:
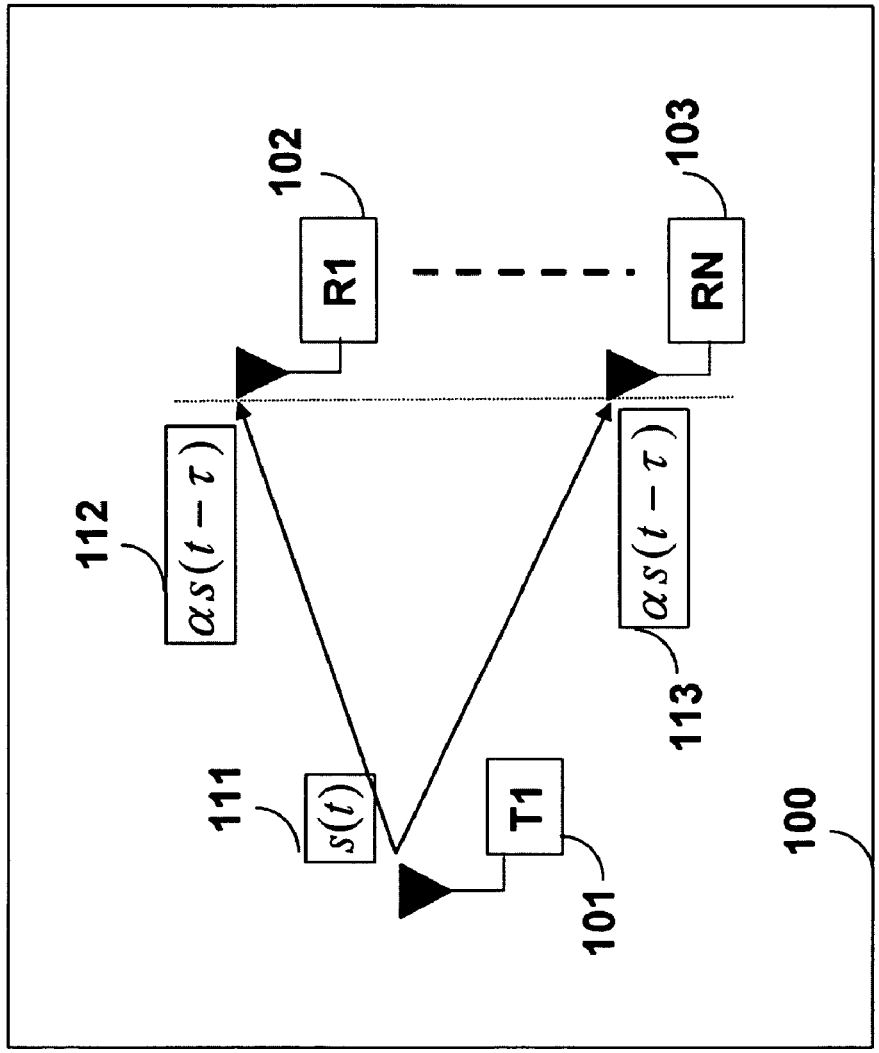
FIG. 1A is a block diagram of conventional SIMO phased-array systems.
Figure 1B:
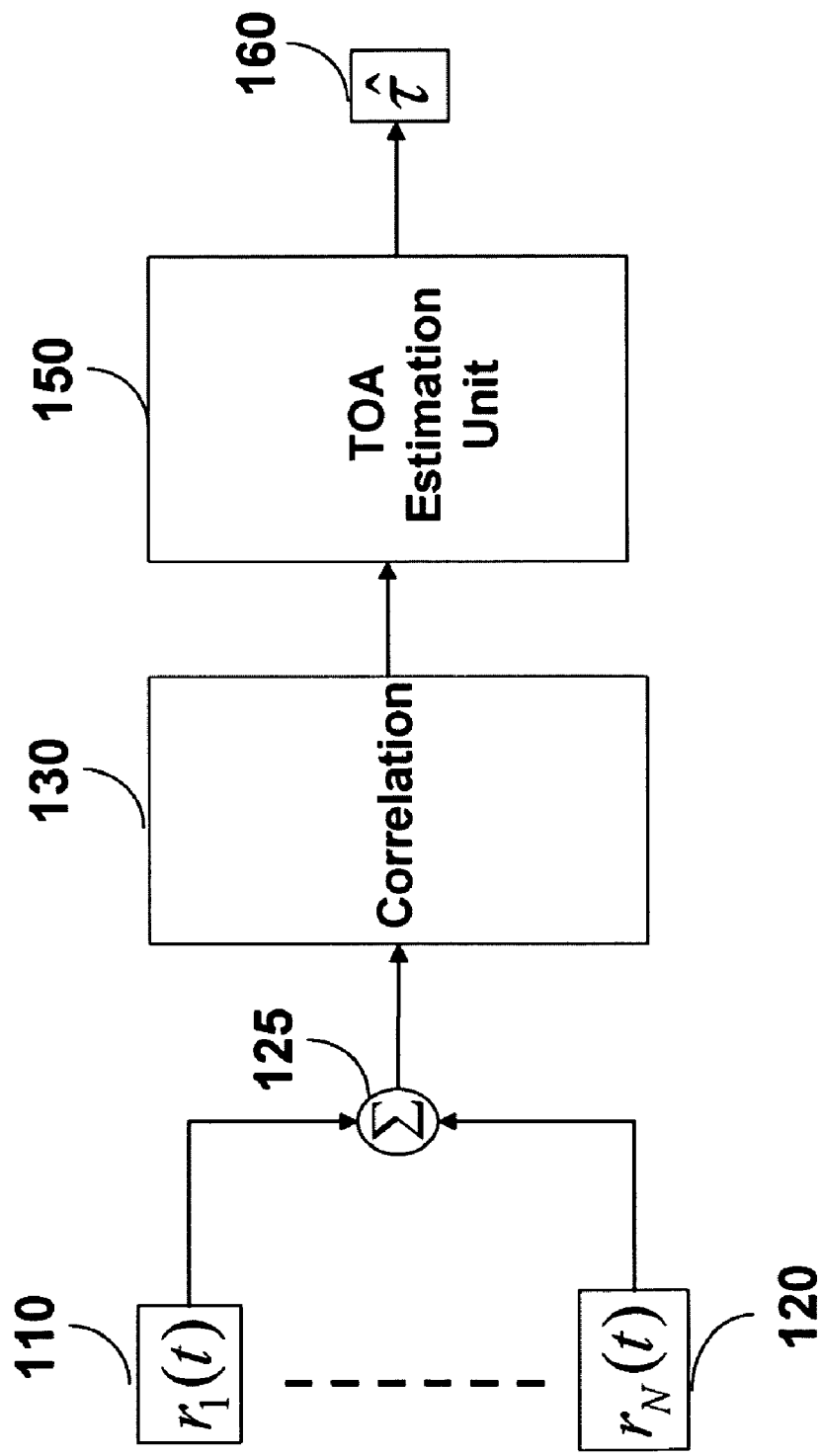
FIG. 1B is a block diagram of a conventional receiver of the system of FIG. 1A.

There is sufficient separation, comparable to the signal wavelength, between all antenna pairs so that different channel coefficients can be measured for the received signals at different antennas. This is unlike the conventional phased array structure of FIG. 1A where all the channel coefficients are the same.

Figure 2B:
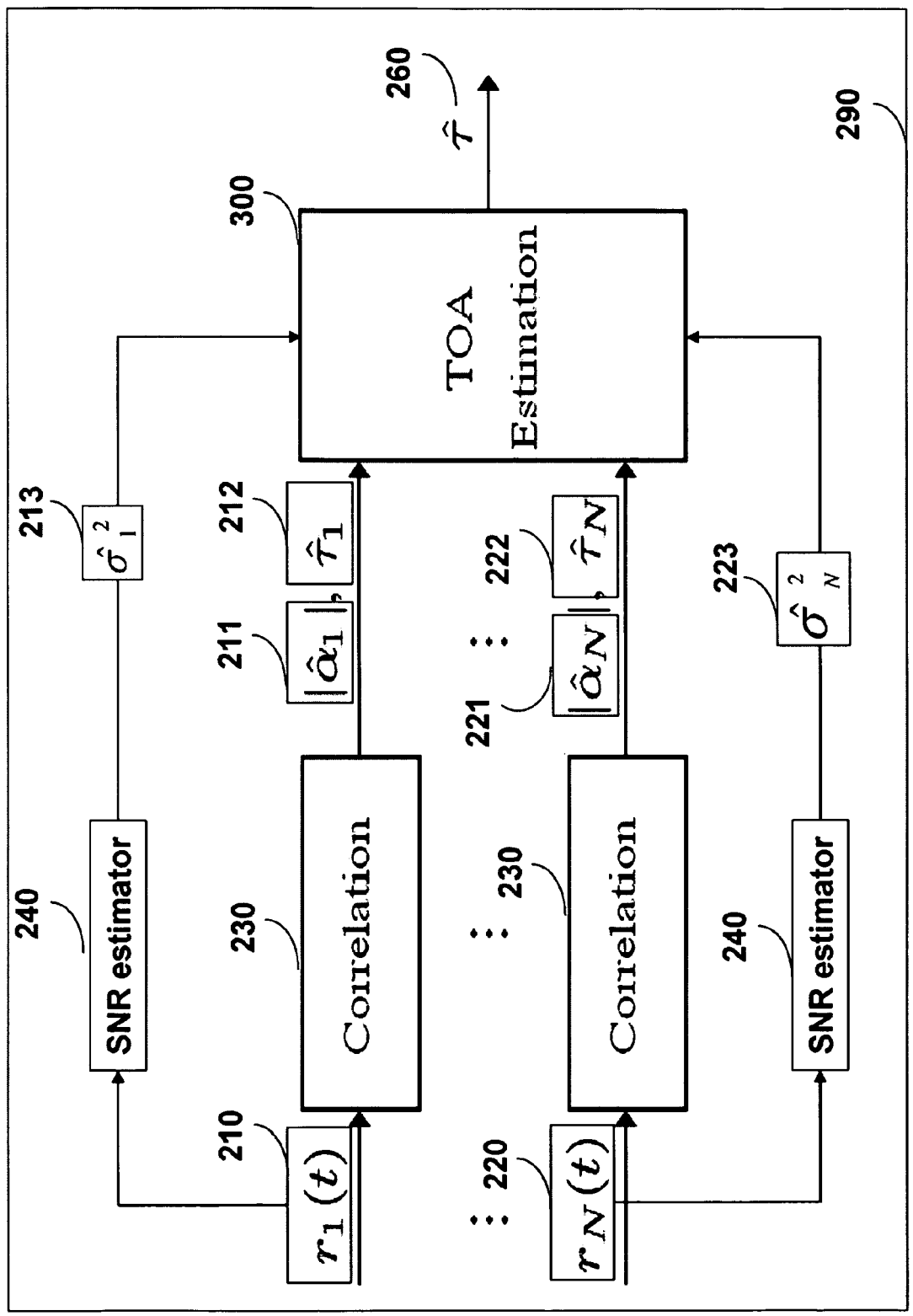
FIG. 2B is a block diagram of a receiver portion of the system of FIG. 2A according to embodiments of the invention.

The ranging for the SIMO system 200 estimates the TOA $\tau$ 260 from the received signals 210 through 220 at N receivers 202 through 203 as shown in FIG. 2B. The channel coefficient vector $\underline{\alpha} = [\alpha_1, \alpha_2, \ldots, \alpha_N]$ is unknown. Therefore, the channel vector also needs to be estimated.

If the vector of complex channel coefficients is $\alpha_i = a_i e^{j\phi_i}$ for $i=1, \ldots N$, the vector of unknown signal parameters can be expressed as $\underline{\lambda} = [\tau, \underline{\alpha}, \underline{\phi}]$, where $\underline{\alpha} = [\alpha_1, \alpha_2, \ldots \alpha_N]$ is the channel coefficient magnitude vector and $\underline{\phi} = [\phi_1, \phi_2, \ldots, \phi_N]$ is the channel coefficient phase vector.

From Equation (4), a log likelihood function of unknown signal parameters $\underline{\lambda}$ can be expressed as $$\Lambda(\underline{\lambda}) = k - \sum_{i=1}^{N} \frac{1}{2\sigma_i^2} \int_0^T |r_i(t) - \alpha_i s(t-\tau)|^2 dt, \quad (5)$$

where k represents a term that is independent of the log likelihood function $\underline{\lambda}$, and T is the duration of the signal $s(t)$. The maximum likelihood (ML) estimate for the parameters $\underline{\lambda}$ can be obtained from Equation (5) as $$\hat{\lambda}_{ML} = \underset{\underline{\lambda}}{\operatorname{argmax}} \left\{ \sum_{i=1}^{N} \frac{1}{\sigma_i^2} \int_0^T \mathcal{R}\{\alpha_i^* r_i(t) s^*(t-\tau)\} dt - \frac{E|\alpha_i|^2}{2\sigma_i^2} \right\}, \quad (6)$$

where E is the energy of the signal $s(t)$ 204, and $s^*(t)$ is the complex conjugate of the signal $s(t)$ 204. For a complex number z, $\mathcal{R}(z)$ indicates the real part of the complex number z.

The CRLB for unbiased delay estimates can be expressed as $$\operatorname{Var}\{\hat{\tau}\} \geq [I^{-1}]_1 = \frac{1}{\gamma \sum_{i=1}^{N} \frac{|\alpha_i|^2}{\sigma_i^2}} \quad (7)$$

where $\gamma = \tilde{E} - \hat{E}^2/E$, and $$\hat{E} = \left| \int_{-\infty}^{\infty} s'(t) s^*(t) dt \right|,$$

N is the number of receivers (each with one antenna), $\sigma_i^2$ is the variance of noise at the receiver r i. Also, E is the energy of the signal $s(t)$, and $\tilde{E}$ is the energy of the first derivative of the signal $s(t)$. The derivative of the signal $s(t)$ is denoted as $s'(t)$, and the complex conjugate of $s(t)$ is denoted as $s^*(t)$.

Equation 7 implies that selecting $s(t)$ such that $\hat{E}=0$ causes the TOA estimation accuracy limits to be the same for known and unknown channel coefficients. In other words, the same estimation accuracy can be obtained in the absence of channel state information if the signal $s(t)$ 204 satisfies the above condition, which is $\hat{E}=0$.

In other words, we selecting the signal $s(t)$ such that its shape satisfies $\hat{E}=0$ and improves the performance of our SIMO ranging. That is, we prefer transmitted signals for which an integration of the product of the signal and its derivative is zero.

Range Estimation

In general, the maximum likelihood estimate of Equation (6) requires optimization over an (N+1)-dimensional space, which can have prohibitive complexity in scenarios with a large number of receive antennas.

FIG. 2B shows a two-step TOA estimator and method 290. The TOA estimator performs joint channel and delay estimation for each signal received at one of the antennas. The TOA is estimated in the second step. Note that the method exploits the multiple-output structure of the SIMO system, which facilitates individual signal processing, such as correlation 230, or matched filter based channel coefficient and delay estimation, for each received signal.

In the first step of the estimating 290, each receiver processes its received signal 210 through 220 individually by correlation 230 with the transmitted signal $s(t)$ 204 to produce estimates of the channel coefficients $\alpha_i$ 211 through 221, and the delays $\tau_i$ 212 through 222, based on the ML method according to Equation (6).

The estimation of the delay of the received signal $r_i(t)$ for receiver $r_i$, with respect to the transmitted signal $s(t)$, can by $$(\hat{\tau}_i, \hat{\phi}_i) = \underset{\tau,\phi_i}{\operatorname{argmax}} \mathcal{R}\left\{ e^{-j\phi_i} \int_0^T r_i(t) s^*(t-\tau) dt \right\}, \quad (8)$$

where $\hat{\tau}_i$ and $\hat{\phi}_i$ are the estimates of the time of arrival and the phase of the channel coefficient of the received signal $r_i(t)$ at receiver $r_i$, and $s^*(t)$ is the complex conjugate of the signal $s(t)$.

Then, the estimate of the magnitude of the channel coefficient $\hat{\alpha}_i$ the signal $r_i$ is $$\hat{a}_i = |\hat{\alpha}_i| = \frac{1}{E} \mathcal{R}\left\{ e^{-j\hat{\phi}_i} \int_0^T r_i(t) s^*(t - \hat{\tau}_i) dt \right\} \quad (9)$$

where E is the energy of the signal $s(t)$, $\hat{\phi}_i$ is an estimate of the phase of the channel coefficient, $\hat{\tau}_i$ is the estimate of the delay at receiver $r_i$, and T is the duration of the signal $s(t)$.

A SNR estimator 240 estimates the variance of noise $\sigma_i^2$ 213 through 223. All the estimated values obtained by solving Equations (8) and (9) for i=1, ..., N, and the estimates of the noise variances 213 through 223 are fed to the TOA estimation unit 300 that returns the final TOA estimate $\hat{\tau}$ 260.

Figure 3:
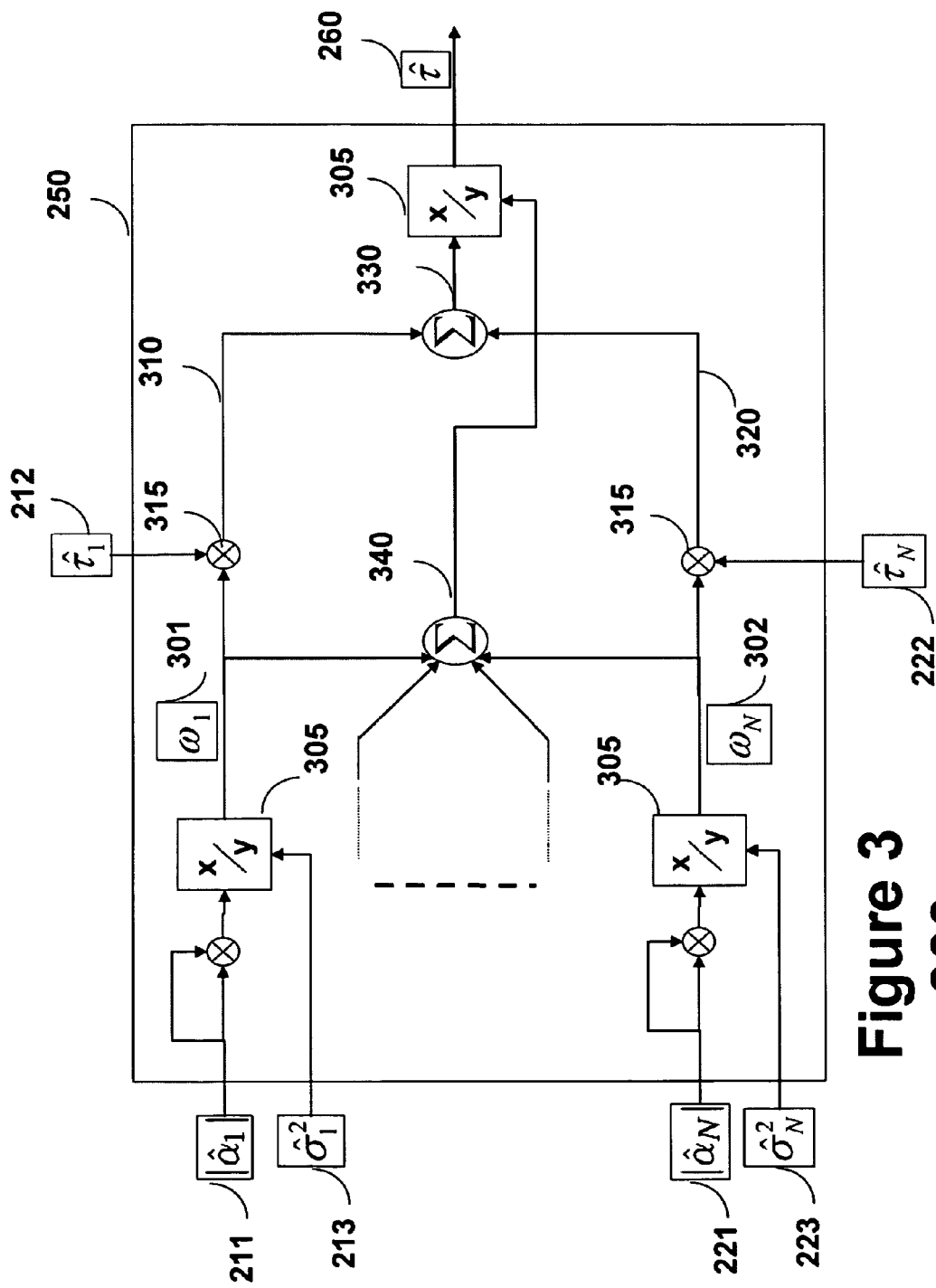
FIG. 3 shows the system and method for time of arrival estimation according to the embodiments of the invention.

As shown in FIG. 3, the TOA estimation process 300 uses the estimates of the channel coefficients and the estimate of the noise variance to determine weights $w_i$ 301 through 302. In FIG. 3, the x/y operations 305 generally indicate division of the variables fed into the operation. The weights are also summed 340. Then, the TOA estimates $\hat{\tau}_i$ are respectively multiplied by the weights $\omega_I$ to obtain weighted TOA estimates 310 through 320. The weighted TOA estimates are summed and normalized by the summed weights to produce the final TOA estimate $\hat{\tau}$ 260.

The final TOA estimate can now be used to determine a distance between the transmitter and the collocated receivers in a ranging application. With multiple transmitters, trilateration can be used to determine positional information for the receiver.

EFFECT OF THE INVENTION

The computational complexity of the two-step estimation according to the embodiment of the invention is dominated by the optimization operations in Equation (8). In other words, the estimator requires the solution of N optimization problems, each over a 2-dimensional space. On the other hand, the optimal ML solution in Equation (6) requires optimization over an (N+1)-dimensional space, which is computationally more complex than the method according to the invention. In fact, as N increases, the optimal solution becomes impractical.

Even with the reduction in the computational complexity of the two step TOA estimation it can be shown that our TOA estimation method performs very closely to the optimal solution; i.e., the method approximately achieves the CRLB of the original problem.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for estimating a time of arrival (TOA) of receiving a signal in a plurality of collocated receivers with respect to transmitting the signal by a single transmitter with a single antenna, wherein each receiver has one antenna, comprising the steps of:
    receiving the signal in each of the plurality of receivers the signal transmitted by the single transmitter via a corresponding channel to produce a plurality of received signals;
    correlating, each received signals with the signal that is transmitted to obtain for each received signal estimated channel coefficients and an estimated TOA;
    determining, for each received signal, a variance of noise;
    determining, for each received signal, a weight, wherein the weight is determined by dividing the channel coefficients by the variance of the noise;
    summing the weights to produce a summed weight;
    multiplying, for each received signal, the estimated TOA by the corresponding weight to produce a weighted estimated TOA;
    summing the weighted estimated TOA for all of the received signals to produce a summed weighted estimated TOA; and
    dividing the summed weighted estimated TOA by the summed weights to determine a final TOA estimate with respect to the transmitted signal;
    determining a distance between the transmitter and the phase center of the collocated receivers based on the final TOA, wherein the steps are performed in a receiver.

2. The method of claim 1, in which the plurality of antennas are approximately collocated such that a maximum distance between a pair of adjacent antennas divided by a speed of light is substantially smaller than a symbol duration of the transmitted signal.

3. The method of claim 1, in which different channel coefficients are determined for each of the received signals.

4. The method of claim 1, further comprising:
    determining a Cramér-Rao lower bound on a variance of the estimated TOA.

5. The method of claim 1, in which the correlation uses a maximum likelihood method.

6. The method of claim 5, in which the maximum likelihood method evaluates $$\hat{\lambda}_{ML} = \underset{\lambda}{\mathrm{argmax}} \left\{ \sum_{i=1}^{N} \frac{1}{\sigma_i^2} \int_0^T \mathcal{R}\{\alpha_i^* r_i(t)s^*(t-\tau)\}dt - \frac{E|\alpha_i^2|}{2\sigma_i^2} \right\},$$

where t represents time, T is a duration of the transmitted signal, N is a number of received signals $r_i$, $\sigma_i^2$ is the variance of the noise, $\alpha_i$ represents the channel coefficients, $\tau$ is the estimated TOA of the transmitted signal, E is the energy of the transmitted signal, and $s^*(t)$ is a complex conjugate of the transmitted signal.

7. The method of claim 6, in which the delay of the received signal $r_i(t)$ with respect to the transmitted signal $s(t)$ is $$(\hat{\tau}_i, \hat{\phi}_i) = \underset{\tau, \phi_i}{\mathrm{argmax}} \mathcal{R}\left\{ e^{-j\phi_i} \int_0^T r_i(t)s^*(t-\tau)dt \right\},$$

where $\hat{\tau}_i$ and $\hat{\phi}_i$ are estimates of the time of arrival and a phase of the channel coefficient of the received signal $r_i(t)$.

8. The method of claim 7, in which a magnitude of the channel coefficient $\hat{\alpha}_i$ for the received signal $r_i$ is $$\hat{a}_i = |\hat{\alpha}_i| = \frac{1}{E}\mathcal{R}\left\{ e^{-j\phi_i} \int_0^T r_i(t)s^*(t-\hat{\tau}_i)dt \right\}.$$

9. The method of claim 1, further comprising:
    transmitted a plurality of transmitted signals by a plurality of transmitter;
    determining, for each transmitted signal, the final TOA estimate; and
    determining a position of the receiver with respect to the plurality of transmitters from the plurality of the final TOA estimates.

10. The method of claim 1, in which an integration of a product of the transmitted signal and a derivative of the transmitted signal is zero.

* * * * *